US012130046B2

(12) United States Patent
Griesinger et al.

(10) Patent No.: US 12,130,046 B2
(45) Date of Patent: Oct. 29, 2024

(54) LIFTING AND TRANSPORTATION FEATURES OF AN AIR HANDLING UNIT (AHU)

(71) Applicant: Air Distribution Technologies IP, LLC, Milwaukee, WI (US)

(72) Inventors: Scott A. Griesinger, Cameron, MO (US); Paul D. Studer, McFall, MO (US); Joseph J. Reba, Red Lion, PA (US); Joseph M. Halza, York, PA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 946 days.

(21) Appl. No.: 17/162,944

(22) Filed: Jan. 29, 2021

(65) Prior Publication Data

US 2022/0243953 A1 Aug. 4, 2022

(51) Int. Cl.
*F24F 13/32* (2006.01)
*B66C 1/66* (2006.01)

(52) U.S. Cl.
CPC ................ *F24F 13/32* (2013.01); *B66C 1/66* (2013.01); *F24F 2221/16* (2013.01)

(58) Field of Classification Search
CPC .......... F24F 13/32; F24F 2221/16; B66C 1/66
USPC ............ 294/215, 67.1; 248/346.01, 248, 674
See application file for complete search history.

(56) References Cited

U.S. PATENT DOCUMENTS

| | | | | | |
|---|---|---|---|---|---|
| 1,126,282 | A * | 1/1915 | Riley | B66C 1/00 294/215 |
| 4,992,005 | A * | 2/1991 | Hilfiker | B66C 1/66 52/125.2 |
| 8,210,488 | B2 * | 7/2012 | Small | F16M 5/00 248/676 |
| 8,622,448 | B1 * | 1/2014 | Butterfield, IV | B66C 1/66 294/67.1 |
| 9,157,272 | B2 * | 10/2015 | Rupel | E06B 9/262 |
| 9,217,581 | B1 * | 12/2015 | Merideth | F24F 13/32 |
| 9,469,510 | B2 * | 10/2016 | Phillip | B66C 1/24 |
| 2005/0034390 | A1 * | 2/2005 | Dubensky | E04B 1/3483 52/302.1 |
| 2005/0035265 | A1 * | 2/2005 | Dubensky | E04H 5/02 248/618 |
| 2022/0127115 | A1 * | 4/2022 | A B | B66C 1/22 |

* cited by examiner

*Primary Examiner* — Paul T Chin
(74) *Attorney, Agent, or Firm* — Fletcher Yoder, PC

(57) ABSTRACT

A heating, ventilation, and/or air conditioning (HVAC) unit includes a base plate having a receptacle configured to receive a lifting lug, a bracket having a mounting plate coupled to the base plate proximate the receptacle, and a ledge of the bracket extending away from the mounting plate and offset from the receptacle such that a distal portion of the ledge is configured to block the lifting lug from contacting an outer surface of the HVAC unit when the lifting lug is in an engaged configuration with the receptacle.

19 Claims, 5 Drawing Sheets

LIFTING AND TRANSPORTATION FEATURES OF AN AIR HANDLING UNIT (AHU)

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and air conditioning (HVAC) systems are generally configured to provide temperature controlled air to one or more internal spaces of a building. For example, various temperature and pressure control devices of the HVAC system may be controlled to generate an air flow having a particular temperature and to direct the conditioned air flow having the particular temperature to the one or more internal spaces. In certain embodiments, an air handling unit (AHU) may be used to regulate and circulate the conditioned air flow to the one or more internal spaces of the building. For example, the AHU may supply the conditioned air flow to ductwork that distributes the conditioned air flow to the various internal spaces. The AHU may include a number of features, such as one or more blowers, one or more fans, one or more filters, one or more motors, one or more heating and/or cooling coils, and the like contained in a housing.

Certain AHUs may be large and may require machinery to lift and transport the AHU. Further, in certain traditional embodiments, the AHU may not be designed for lifting and transportation via standard systems (e.g., standard systems configured to lift shipboard containers). Thus, in certain traditional embodiments, lifting and transportation systems may be customized or tailored to facilitate lifting of the AHU onto the transportation system (e.g., a truck), and to facilitate safe transport of the AHU via the transportation system (e.g., the truck). Customization and/or tailoring of the lifting and transportation systems and other aspects of traditional systems may contribute to a cost of the AHU, the lifting procedure, the transportation procedure, or a combination thereof. Accordingly, improved AHUs configured to interface with standard lifting and transportation systems are desired.

SUMMARY

A summary of an embodiment disclosed herein is set forth below. It should be understood that these aspects are presented merely to provide the reader with a brief summary of one embodiment and that these aspects are not intended to limit the scope of this disclosure. Indeed, this disclosure may encompass a variety of aspects that may not be set forth below.

An embodiment of the present disclosure includes a heating, ventilation, and/or air conditioning (HVAC) unit including a base plate having a receptacle configured to receive a lifting lug, a bracket having a mounting plate coupled to the base plate proximate the receptacle, and a ledge of the bracket extending away from the mounting plate and offset from the receptacle such that a distal portion of the ledge is configured to block the lifting lug from contacting an outer surface of the HVAC unit when the lifting lug is in an engaged configuration with the receptacle.

Another embodiment of the present disclosure includes a heating, ventilation, and/or air conditioning (HVAC) unit. The HVAC unit includes a housing configured to house components of the HVAC unit, a base plate configured to support a weight of the housing and the components of the HVAC unit, the base plate including a plurality of receptacles configured to receive a plurality of lifting lug, and a plurality of brackets corresponding to the plurality of receptacles. Each bracket includes a mounting plate coupled to the base plate proximate a corresponding receptacle of the plurality of receptacles. Each bracket also includes a ledge extending away from the mounting plate and offset from the corresponding receptacle of the plurality of receptacles such that a distal portion of the ledge is configured to block a corresponding lifting lug of the plurality of lifting lugs from contacting a first outer surface of the housing, a second outer surface of the base plate, or both the first surface and the second surface when the corresponding lifting lug is engaged with the corresponding receptacle.

Another embodiment of the present disclosure includes an air handling unit (AHU). The AHU includes a base plate including a receptacle configured to receive a lifting lug, a bracket including a mounting plate configured to be coupled to the base plate proximate the receptacle, and a ledge of the bracket. The ledge extends away from the mounting plate such that a distal portion of the ledge is configured to block the lifting lug from contacting an outer surface of the HVAC unit when the lifting lug is in an engaged configuration with the receptacle and when the mounting plate of the bracket is coupled to the base plate proximate the receptacle

BRIEF DESCRIPTION OF THE DRAWINGS

Various aspects of this disclosure may be better understood upon reading the following detailed description and upon reference to the drawings in which.

DETAILED DESCRIPTION

Figure 1:
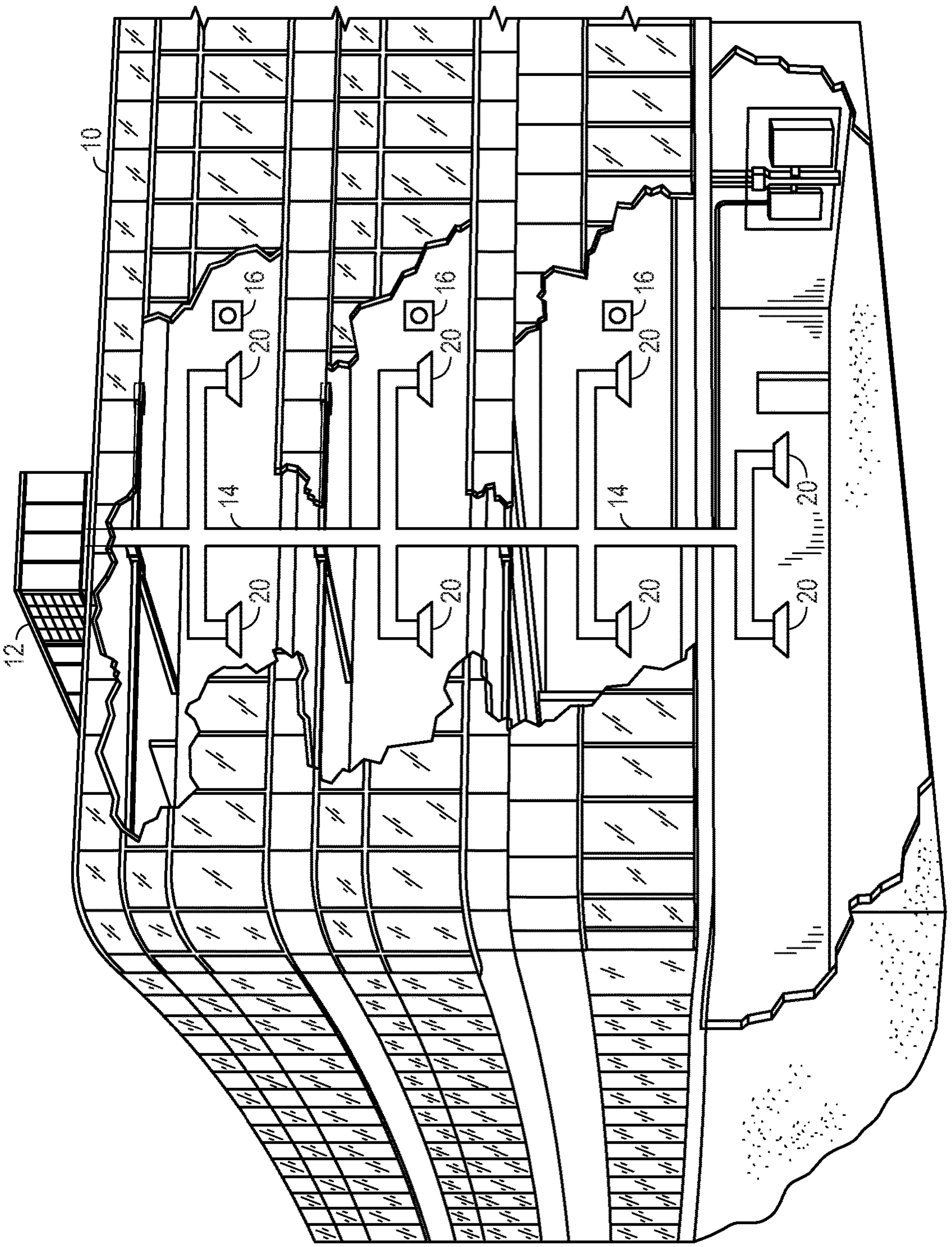
FIG. 1 is a perspective view of a heating, ventilation, and air conditioning (HVAC) system for building environmental management, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terminals "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to an air handling unit (AHU) having a base plate and corresponding features configured to enable the AHU to be interfaced with standard lifting and transportation systems used, for example, with standard shipboard containers. The base plate of the AHU may include outer rails having receptacles configured to receive first ends of standard lifting lugs utilized in the standard lifting systems. Second ends of the standard lifting lugs, which oppose the first ends engaged with the receptacles of the base plate, may be coupled to chains, ropes, or the like that are used to lift the AHU (e.g., via a winch, crane, and/or other lifting mechanism).

Brackets may be mounted to outward facing surfaces of the outer rails of the base plate and adjacent to the receptacles in the base plate, each bracket including a ledge extending outwardly from the outward facing surfaces. As the AHU is lifted, the second ends of the lifting lugs may tend to rotate inwardly toward the outward facing surfaces of the base plate and/or outward facing surfaces of a housing of the AHU, the housing resting atop the base plate. The ledges of the brackets may be configured to block the second ends of the lifting lugs from contacting the outward facing surfaces of the base plate and/or housing, thereby blocking the lifting lugs from scratching, denting, or otherwise damaging the outward facing surfaces.

After the AHU is lifted and placed on a platform (e.g., a truck bed) for transportation, the lifting lugs may be removed and a clevis associated with the standard transportation system may be employed to interface with openings in the bracket. The clevis may be connected to chains and or ropes utilized to tie the AHU down to the platform to facilitate safe transportation of the AHU. Other features of the present disclosure (e.g., of the base plate, the bracket, and the like) will be described in detail below with reference to the drawings. In general, presently disclosed embodiments may reduce a cost of the AHU, a cost of lifting the AHU, and/or a cost of transporting the AHU.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10. However, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system.

The HVAC unit 12 may be an air cooled device that implements a refrigeration cycle to provide conditioned air to the building 10. Specifically, the HVAC unit 12 may include one or more heat exchangers across which an airflow is passed to condition the airflow before the airflow is supplied to the building. In the illustrated embodiment, the HVAC unit 12 is an AHU, such as a rooftop unit (RTU), that conditions a supply air stream, such as environmental air and/or a return airflow from the building 10. Outdoor units, indoor units, or other conditioning schemes are also possible. After the HVAC unit 12 conditions the air, the air is supplied to the building 10 via ductwork 14 extending throughout the building 10 from the HVAC unit 12. For example, the ductwork 14 may extend to various individual floors or other sections, such as rooms, of the building 10. Terminal units 20 associated with the floors, rooms, or other sections of the building 10 may be connected to the ductwork 14 and may be configured to distribute the airflow to the floors, rooms, or other sections of the building 10. In some embodiments, the terminal units 20 may include air conditioning features in addition to, or in the alternate of, the air conditioning features of the HVAC unit 12.

In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream. Additionally or alternatively, other HVAC equipment may be installed at the terminal units 20 or in another area of the building, such as a basement 21 (e.g., a boiler may be installed in a basement of the building 10). A control device 16, one type of which may be a thermostat, may be used to designate the temperature of the conditioned air. The control device 16 also may be used to control the flow of air from the HVAC unit 12, through the ductwork 14, to the terminal units 20, or any combination thereof. For example, the control device 16 may be used to regulate operation of one or more components of the HVAC unit 12 and/or terminal units 20. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

As previously described, the HVAC unit 12 of FIG. 1 may be an AHU, such as an RTU or some other type of AHU. In accordance with the present disclosure, the HVAC 12 unit of FIG. 1 (referred to below as the AHU) may be configured to interface with standard lifting and transportation systems used, for example, for lifting and/or transporting standard shipboard containers. A base plate of the AHU may include outer rails having receptacles configured to receive first ends of standard lifting lugs utilized in standard lifting and transportation systems. Second ends of the standard lifting lugs, which oppose the first ends engaged with the receptacles of the base plate, may be coupled to chains, ropes, or the like that are used to lift the AHU (e.g., via a winch, crane, and/or other lifting mechanism). Brackets may be mounted to outward facing surfaces of the outer rails of the base plate and adjacent to the receptacles in the base plate, each bracket including a ledge extending outwardly from the outward facing surfaces. As the AHU is lifted, the second ends of the lifting lugs may tend to rotate (e.g., about an engagement point of the first ends with the receptacles of the base plate) inwardly toward the outward facing surfaces of the base plate and/or outward facing surfaces of a housing of the AHU, the housing resting atop the base plate. The ledges of the brackets may be configured to block the second ends of the lifting lugs from contacting the outward facing surfaces of the base plate and/or housing, thereby blocking the lifting lugs from scratching, denting, or otherwise damaging the outward facing surfaces.

After the AHU is lifted and placed on a platform (e.g., a truck bed) for transportation, the lifting lugs may be removed and a clevis of a standard transportation system may be employed to interface with openings in the bracket. The clevis may be connected to chains and or ropes utilized to tie the AHU down to the platform to facilitate safe transportation of the AHU (e.g., via a truck having the truck bed). Other features of the present disclosure (e.g., of the base plate, the bracket, and the like) will be described in detail below with reference to FIGS. 2-7. In general, presently disclosed embodiments may reduce a cost of the AHU relative to traditional embodiments, a cost of lifting the AHU relative to traditional embodiments, and/or a cost of transporting the AHU relative to traditional embodiments.

Figure 2:
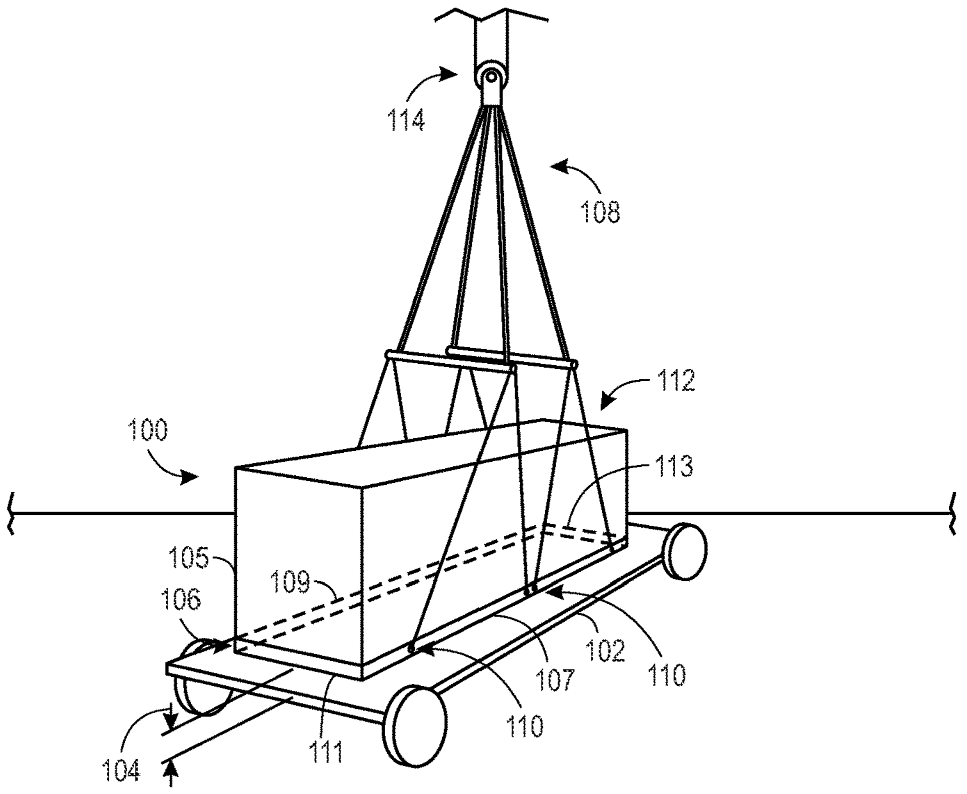
FIG. 2 is a schematic perspective view of an air handling unit (AHU) for use in the system of FIG. 1, and a standard lifting system for lifting the AHU onto a platform, in accordance with an aspect of the present disclosure.

FIG. 2 is a schematic perspective view of an embodiment of the present disclosure, including an air handling unit (AHU) 100 for use in the system or building 10 of FIG. 1, and a standard lifting system 108 used to lift the AHU 100 onto a platform 102 (e.g., a bed of a truck). The AHU 100 in FIG. 2, for example, may correspond to the HVAC unit 12 of FIG. 1, as previously described. However, it should be understood that the present disclosure is intended to include any type of the AHU 100, including an RTU, a packaged unit (PU), a heating and cooling unit (HCU), a makeup air unit (MAU), a fresh air handling unit (FAHU), and the like.

In the illustrated embodiment, the AHU 100 is being lifted via the standard lifting system 108 onto the platform 102. In accordance with present embodiments, the AHU 100 may include a base plate 106 configured to be interfaced with standard lifting equipment of the standard lifting system 108. For example, the base plate 106 may include outer rails 107 and 109 having receptacles configured to be engaged by aspects of the standard lifting system 108. In some embodiments, the outer rails 107 and 109 may be coupled via additional outer rails 111 and 113 (e.g., via welding) traversing between the outer rails 107 and 109 to form a frame of the base plate 106. Additionally or alternatively, the base plate 106 may include a cross-member plate extending across the outer rails 107 and 109 and the additional outer rails 111 and 113 (e.g., across tops of the outer rails 107 and 109 and the additional outer rails 111 and 113). In general, the base plate 106 is configured to support a weight of a housing 105 of the AHU 100 and any components of the AHU 100 disposed in the housing 105.

The standard lifting system 108 may include standard lifting lugs 110 configured to engage the base plate 106 (e.g., at receptacles of the outer rails 107 and 109, as previously described), standard ropes, chains, or cables 112 coupled to the standard lifting lugs 110, and a standard winch 114 (and/or other lifting mechanism, such as a crane) coupled to the standard ropes, chains, or cables 112. Together, the standard lifting lugs 110, the standard ropes, chains, or cables 112, and the standard winch 114 (and/or other lifting mechanism, such as a crane) are utilized to lift the AHU 100 onto the platform 102 (e.g., such that the base plate 106 of the AHU 100 rests on or against the platform 102). In general, the base plate 106 and corresponding features described in detail below may be configured to block aspects of the standard lifting system 108, such as the standard lifting lugs 110, from scratching, denting, or otherwise damaging the AHU 100. Further, the base plate 106 and corresponding features described in detail below may be configured to enable safe transport of the AHU 100 via a vehicle (e.g., a truck) associated with the platform 102 (e.g., after the AHU 100 is disposed on the platform 102 and the above-described features of the standard lifting system 108 are removed). These features are illustrated in FIGS. 3-7 and described in detail below.

Figure 3:
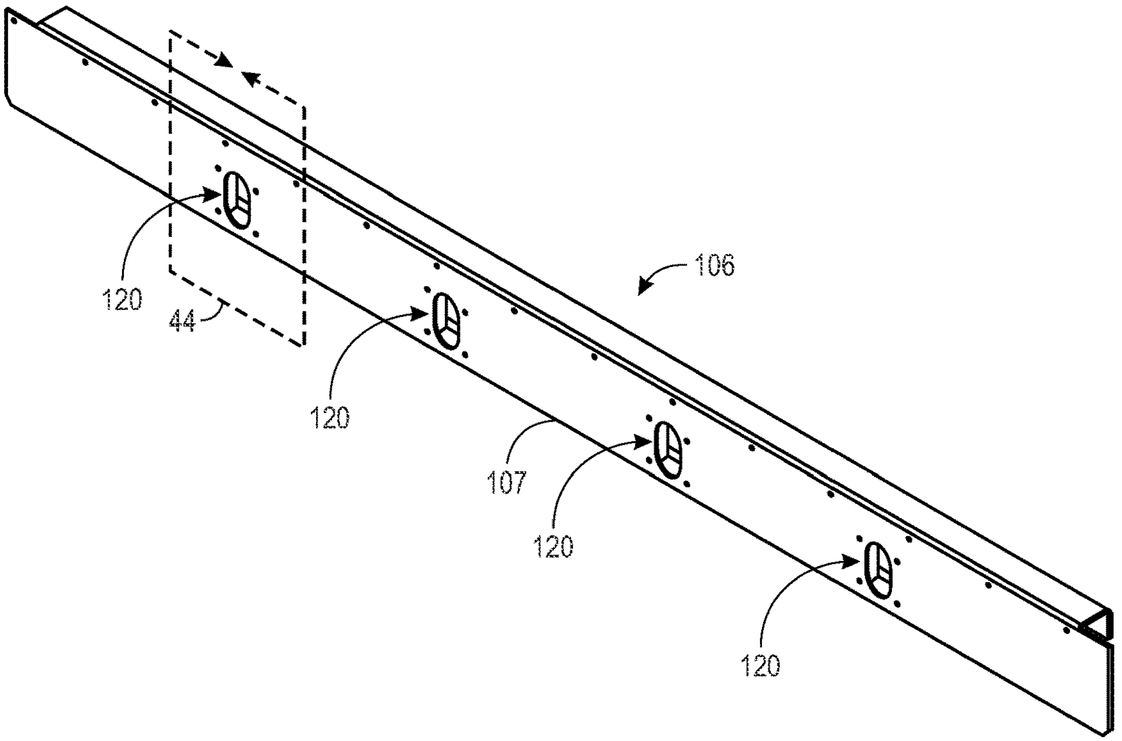
FIG. 3 is a perspective view of a portion of a base plate for use in the AHU of FIG. 2, in accordance with an aspect of the present disclosure.

FIG. 3 is a perspective view of an embodiment of the present disclosure, including a portion of the base plate 106 for use in the AHU 100 of FIG. 2. For example, FIG. 3 illustrates a portion of the outer rail 107 of the base plate 106 of the AHU 100 in FIG. 2. In the illustrated embodiment, the outer rail 107 of the base plate 106 includes four receptacles 120 configured to be engaged by the previously described standard lifting lugs (not shown in FIG. 3). It should noted that more than four of the receptacles 120 may be employed on the outer rail 107, and that less than four of the receptacles 120 may be employed on the outer rail 107, depending on an AHU size and/or weight, aspects of the standard lifting system (not shown in FIG. 3), or a combination thereof.

Figure 4:
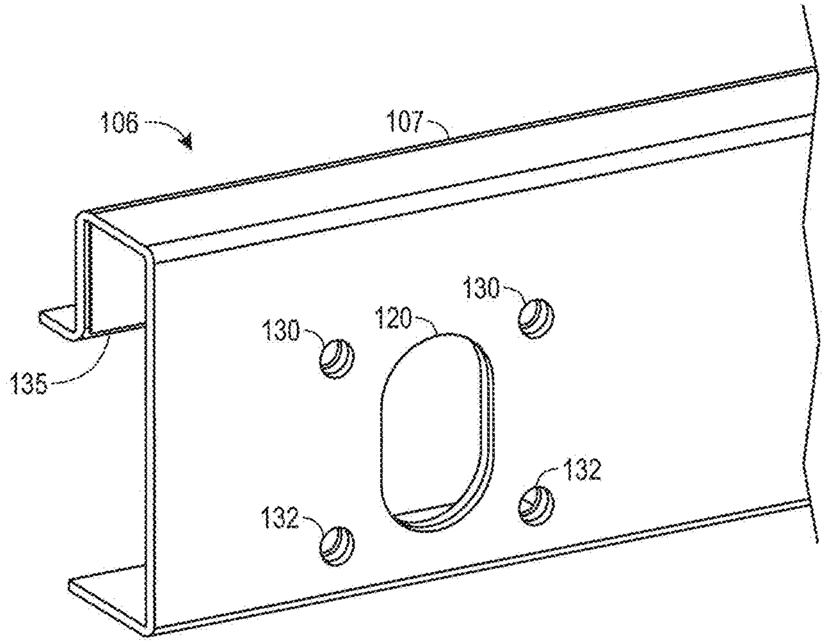
FIG. 4 is a perspective view of a portion of the base plate illustrated in FIG. 3, taken along line 4-4 in FIG. 3, for use in the AHU of FIG. 2, in accordance with an aspect of the present disclosure.

FIG. 4 is a perspective view of an embodiment of the present disclosure, including a portion of the base plate 106 illustrated in FIG. 3, taken along line 4-4 in FIG. 3, for use in the AHU 100 of FIG. 2. As previously described, the outer rail 107 of the base plate 106 includes at least one receptacle 120 configured to be engaged by a standard lifting lug (not shown in FIG. 4). Further, the outer rail 107 includes openings 130 (e.g., upper openings) and additional openings 132 (e.g., lower openings) formed about the receptacle 120. The upper openings 130 may be configured to enable mounting of a bracket (not shown in FIG. 4) proximate to, or about, the receptacle 120. The upper openings 130 and the lower openings 132 may also be used for securing a backing plate 135 to the outer rail 107 of the base plate 106. The bracket and the backing plate 135 will be described in detail below.

Figure 5:
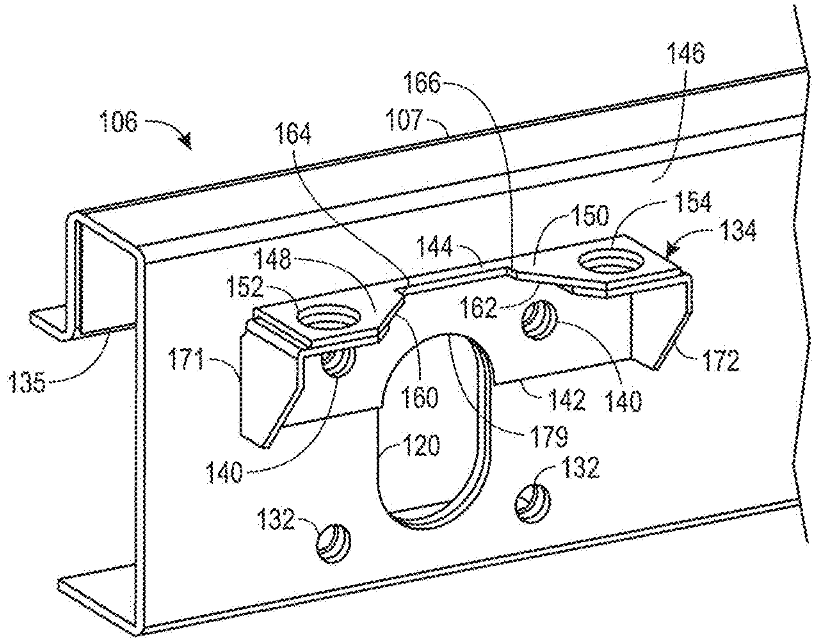
FIG. 5 is a perspective view of the portion of the base plate in FIG. 4 for use in the AHU of FIG. 2, and a bracket configured to be mounted to the base plate, in accordance with an aspect of the present disclosure.

FIG. 5 is a perspective view of an embodiment of the present disclosure, including the portion of the base plate 106 of FIG. 4 for use in the AHU 100 of FIG. 2, and including a bracket 134 configured to be mounted to the base plate 106 (e.g., the outer rail 107 of the base plate 106). The bracket 134 in the illustrated embodiment includes mounting openings 140 configured to align with the upper openings 130 of the outer rail 107 as illustrated in FIG. 4. For example, fasteners may extend through the mounting openings 140 of the bracket 134 illustrated in FIG. 5 and the upper openings 130 of the outer rail 107 as illustrated in FIG. 4.

The bracket 134 includes a mounting plate 142 (e.g., mounting portion) that abuts the outer rail 107. The mounting plate 142 includes the above-described mounting openings 140 formed therein. The bracket 134 also includes a central ledge 144 extending transverse to (e.g., outwardly from) the mounting plate 142. In some embodiments, the central ledge 144 of the bracket 134 extends perpendicular to the mounting plate 142 of the bracket 134. As will be appreciated below with reference to later drawings, a distal end or portion of the central ledge 144 of the bracket 134 may be configured to block a standard lifting lug, when engaged with the receptacle 120, from rotating inwardly toward and into an outward facing surface 146 of the outer rail 107 and/or an outward facing surface of a housing resting atop the base plate 106. In some embodiments, the bracket 134 may be integrally formed with the outer rail 107 of the base plate 106. For example, the bracket 134 may not include the mounting plate 142, and may instead include the central ledge 144 and other features (e.g., second and third ledges 148, 150 described below) extending directly from the outer rail 107 of the base plate 106.

The bracket 134 also includes a second ledge 148 and a third ledge 150 between which the central ledge 144 is disposed. The second ledge 148 may include a clevis opening 152 and the third ledge 150 may include an additional clevis opening 154. The clevis openings 152, 154 may be configured to receive respective arms of a clevis after the AHU having the base plate 106 is lifted onto a transportation platform (e.g., a bed of a truck), where the clevis is interfaced with ropes, chains, cables, or the like configured to secure the AHU having the base plate 106 to the transportation platform. In some embodiments, the standard lifting lug configured to engage the receptacle 120 of the outer rail 107 of the base plate 106 may be removed from the receptacle 120, and the clevis having the respective clevis arms may be engaged with the clevis openings 152, 154.

The second ledge 148 may include a chamfered edge 160 and the third ledge 150 may include an additional chamfered edge 162. The chamfered edge 160 and the additional chamfered edge 162 may define a mouth configured to enable engagement of the standard lifting lug with the receptacle. That is, the chamfered edge 160 and the additional chamfered edge 162 may permit some side-to-side movement of the standard lifting lug as the standard lifting lug is moved toward the receptacle 120 for engagement. A flat edge 164 may connect the chamfered edge 160 of the second ledge 148 to the central ledge 144, and an additional flat edge 166 may connect the chamfered edge 162 of the third ledge 150 to the central ledge 144. The bracket 134 also includes arms 171 and 172 extending between the mounting plate 142 of the bracket 134 and the second and third ledges 148, 150, respectively, enhancing a structural rigidity of the bracket 134. Further, the bracket 134 includes a curvilinear surface 179 that corresponds in shape to a curvature of the receptacle 120 formed in the outer rail 107 of the base plate 106. It should be noted that the bracket 134 may include a single-piece construction, or the bracket 134 may include multiple parts coupled together (e.g., via welding, adhesives, fasteners, etc.).

Figure 6:
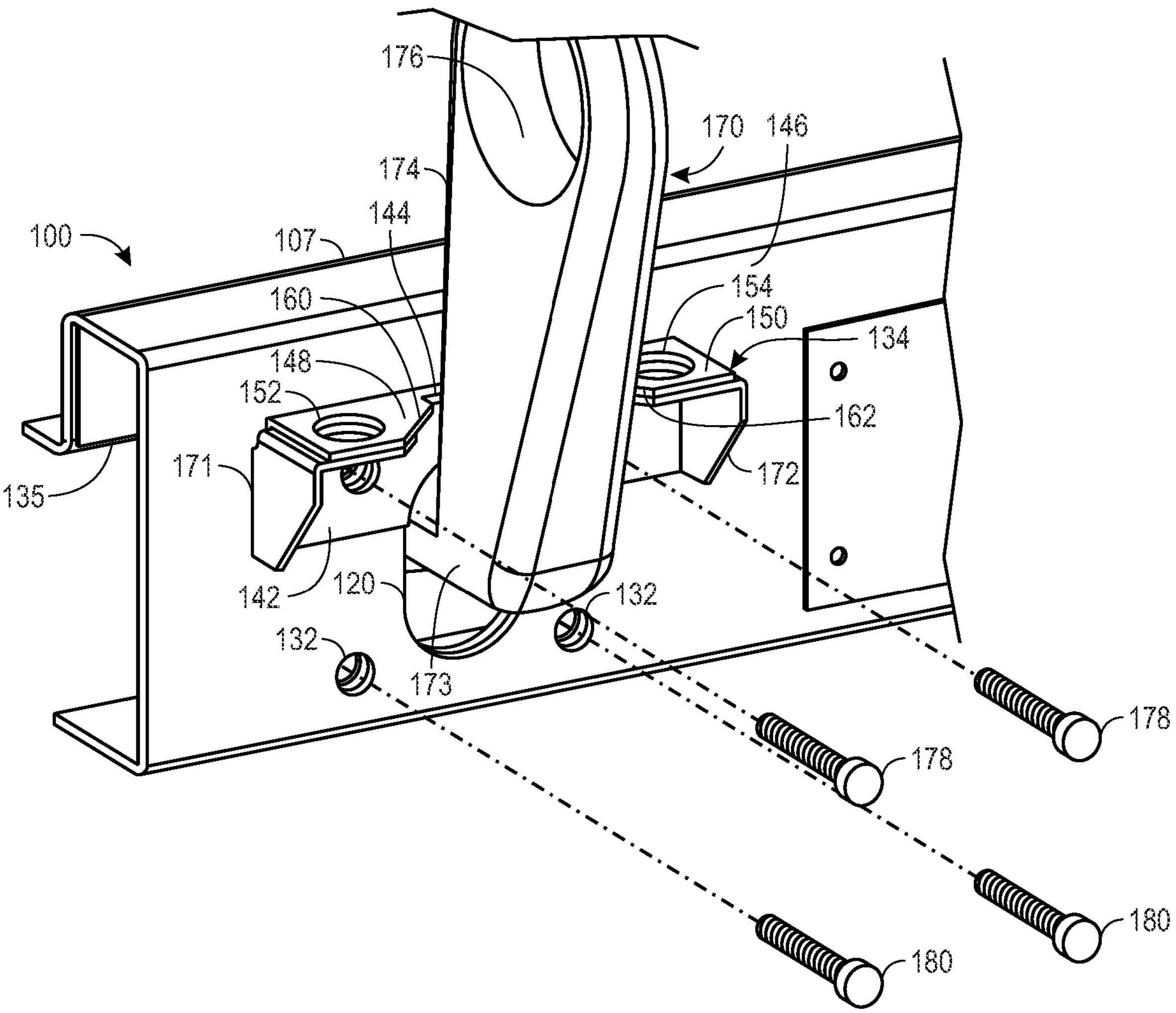
FIG. 6 is a perspective view of the portion of the base plate in FIG. 4 for use in the AHU of FIG. 2, a bracket configured to be mounted to the base plate, and a lifting lug configured to engage a receptacle disposed in the base plate, in accordance with an aspect of the present disclosure.

FIG. 6 is a perspective view of an embodiment of the present disclosure, including the portion of the base plate 106 (e.g., the outer rail 107 of the base plate 106) in FIG. 4 for use in the AHU 100 of FIG. 2, the bracket 134 configured to be mounted to the base plate 106, and a lifting lug 170 configured to engage the receptacle 120 disposed in the base plate 106. In the illustrated embodiment, the lifting lug 170 includes a first end 173 configured to engage the receptacle 120 (e.g., extend through the receptacle 120) and a second end 174 opposing the first end 173. The second end 174 of the lifting lug 170 includes an opening 176 configured to be engaged by a rope, cable, or chain utilized to lift the base plate 106 and corresponding AHU. As the AHU is lifted, the lifting lug 170 may tend to rotate about an engagement point with the receptacle 120 of the outer rail 107 of the base plate 106. That is, the second end 174 of the lifting lug 170 may tend to rotate inwardly toward the outward facing surface 146 of the outer rail 107 of the base plate 106 and/or an outward facing surface of the housing of the AHU. However, the bracket 134 includes, as previously described, the central ledge 144 extending from the mounting plate 142 of the bracket 134, where the central ledge 144 is configured to block the lifting lug 170 (e.g., the second end 174 of the lifting lug 170) from contacting the outward facing surface 146 of the outer rail 107 of the base plate 106 and/or the outward facing surface of the housing of the AHU. Further, as previously described, the second ledge 148 and the third ledge 150 are of the bracket 134 extend from the mounting plate 142 of the bracket 134 on opposing sides of the central ledge 144, where the second ledge 148 includes the chamfered edge 160 and the third ledge 150 includes the additional chamfered edge 162 that define a mount configured to receive the lifting lug 170 as the lifting lug 170 is engaged with the receptacle 120.

Fasteners 178 may be utilized to mount the bracket 134 to the outer rail 107 of the base plate 106. For example, the fasteners 178 extend through the mounting openings 140 illustrated in FIG. 5 relative to the bracket 134, and through the upper openings 130 illustrated in FIG. 4 relative to the outer rail 107. The fasteners 178 may also extend through openings of the backing plate 135 disposed on an opposing side of the outer rail 107 and described in detail with reference to FIG. 7. Further, additional fasteners 180 may extend through the lower openings 132 of the outer rail 107 of the base plate 106 and through corresponding openings of the backing plate 135, described in detail below with reference to FIG. 7.

Figure 7:
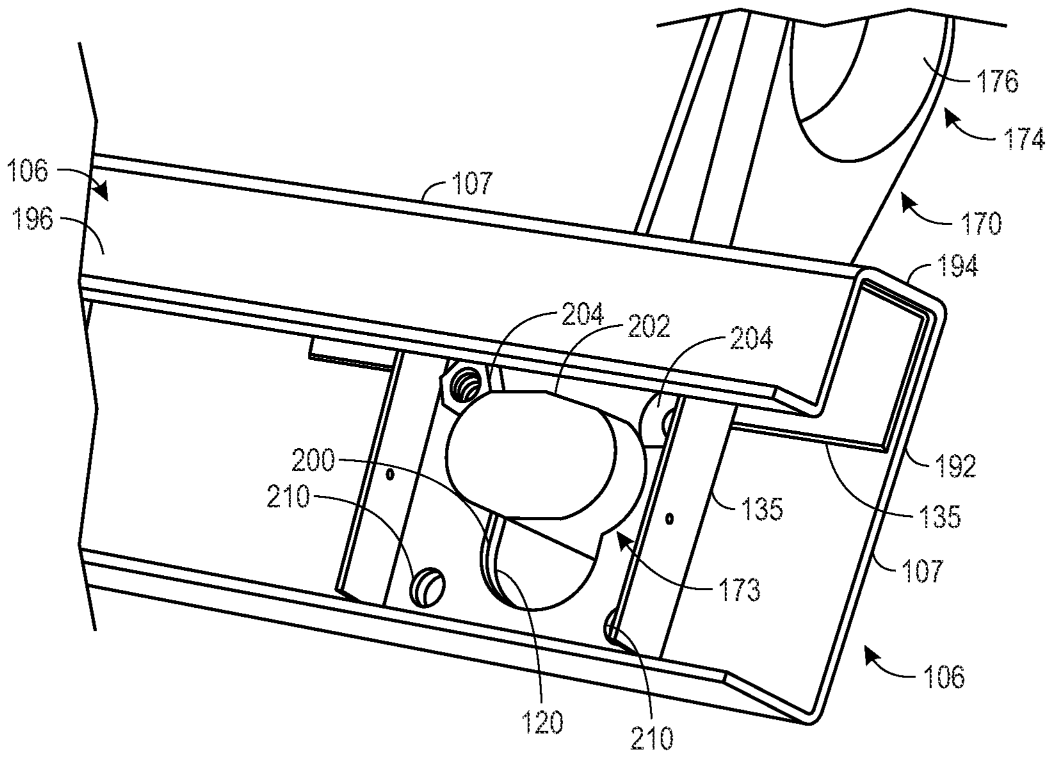
FIG. 7 is a back perspective view of the portion of the base plate in FIG. 4 for use in the AHU of FIG. 2, a backing plate disposed in a channel of the base plate, and a lifting lug configured to engage a receptacle disposed in the base plate, in accordance with an aspect of the present disclosure.

FIG. 7 is a back perspective view of the portion of the base plate 106 (e.g., the outer rail 107 of the base plate 106) in FIG. 4 for use in the AHU 100 of FIG. 2, the backing plate 135 disposed in a channel 190 of the base plate 106, and the lifting lug 170 configured to engage the receptacle 120 disposed in the base plate 106. As previously described, the outer rail 107 of the base plate 106 may define the channel 190 configured to receive the backing plate 135. For example, the channel 190 may be defined by a first wall 192 in which the receptacle 120 is formed, a second wall 194 coupled extending transverse to (e.g., perpendicular to) the first wall 192, and a third wall 196 coupled and extending transverse to (e.g., perpendicular to) the second wall 194. A fourth wall 198 may also be coupled and extending transverse to (e.g., perpendicular to) the third wall 196. As shown in FIG. 7, the backing plate 135 may include a receptacle 200 that corresponds in size and shape to the receptacle 120 of the outer rail 107 of the base plate 106. Accordingly, the first end 173 of the lifting lug 170 may extend through the receptacle 120 of the outer rail 107 of the base plate 106 and through the receptacle 200 formed in the backing plate 135. The first end 173 of the lifting lug 170 may include an anchor 202 that generally corresponds in size and shape to the receptacles 120, 200. In some embodiments, the receptacles 120, 200 and the anchor 202 of the first end 173 of the lifting lug 170 may include oblong shapes. When the anchor 202 is disposed through the receptacles 120, 200, the lifting lug 170 may be positioned at a 90 degree angle relative to a lifting position of the lifting lug 170 in order to pass the lifting lug 170 through the receptacles 120, 200. After passing the lifting lug 170 through the receptacles 120, 200, the lifting lug 170 may be turned 90 degrees such that the oblong shape of the anchor 202 is at a 90 degree angle relative to the aligned oblong shapes of the receptacles 120, 200, thereby ensuring that the lifting lug 170 will not disengage from the receptacles 120, 200 during a lifting process.

Nuts 204 may be employed to receive the fasteners 178 illustrated in FIG. 6. That is, the fasteners 178 illustrated in FIG. 6, which extend through the bracket 134 illustrated in FIG. 6, the outer rail 107 of the base plate 106 illustrated in FIG. 7, and the backing plate 135 illustrated in FIG. 7 may engage the nuts 204 illustrated in FIG. 7 to secure the assembly. Although not shown in FIG. 7, additional nuts may be employed to receive the additional fasteners 180 illustrated in FIG. 6, which extend through the outer rail 107 of the base plate 106 in FIG. 7 and openings 210 formed in the backing plate 135 as shown in FIG. 7.

Once the lifting lug 170 is in an engaged position, the lifting lug 170 may be utilized to lift the base plate 106. As previously described, the outer rail 107 of the base plate 106 may include a plurality of receptacles configured to receive a plurality of lifting lugs. Further, an additional outer rail of the base plate 106 (e.g., the outer rail 109 illustrated in FIG. 2) may include a similar arrangement, such that the lifting forces exerted on the base plate 106 and corresponding AHU are generally symmetrical.

One or more of the disclosed embodiments, alone or in combination, may provide one or more technical effects useful in lifting and transporting an AHU. For example, presently disclosed embodiments enable a base plate of the AHU to be interfaced with (or by) standard lifting equipment (e.g., lifting equipment designed for standard shipboard containers). In general, presently disclosed embodiments may reduce a cost of the AHU relative to traditional embodiments, a cost of lifting the AHU relative to traditional embodiments, and/or a cost of transporting the AHU relative to traditional embodiments While only certain features and embodiments of the disclosure have been illustrated and described, many modifications and changes may occur to those skilled in the art, such as variations in sizes, dimensions, structures, shapes and proportions of the various elements, values of parameters including temperatures and pressures, mounting arrangements, use of materials, colors, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) unit, comprising:

a base plate including a receptacle configured to receive a lifting lug;

a bracket discrete from the base plate and comprising a mounting plate, wherein the mounting plate is configured to be coupled to the base plate proximate the receptacle via one or more fasteners; and a ledge of the bracket extending away from the mounting plate and configured to be offset from the receptacle such that a distal portion of the ledge is configured to block the lifting lug from contacting an outer surface of HVAC unit componentry when the lifting lug is in an engaged configuration with the receptacle.

2. The HVAC unit of claim 1, comprising an air handling unit (AHU), wherein the AHU comprises the base plate and the bracket.

3. The HVAC unit of claim 1, comprising a housing disposed above the base plate, wherein the mounting plate of the bracket is configured to be coupled to the base plate via the one or more fasteners such that the ledge is disposed between the housing of the HVAC unit and the receptacle in the base plate.

4. The HVAC unit of claim 1, comprising a housing disposed above the base plate, wherein the housing comprises the outer surface of the HVAC unit componentry.

5. The HVAC unit of claim 1, wherein the bracket comprises a second ledge and a third ledge, the ledge is disposed between the second ledge and the third ledge, the second ledge comprises an opening, the third ledge comprises an additional opening, and the opening and the additional opening are configured to receive respective arms of a clevis.

6. The HVAC unit of claim 1, wherein the bracket comprises a second ledge and a third ledge, the ledge is disposed between the second ledge and the third ledge, the second ledge comprises a chamfered edge adjacent to the ledge, and the third ledge comprises an additional chamfered edge adjacent to the ledge.

7. The HVAC unit of claim 6, wherein the second ledge comprises an edge extending between and transverse to the ledge and the chamfered edge of the second ledge, and the third ledge comprises an additional edge extending between and transverse to the ledge and the additional chamfered edge of the third ledge.

8. The HVAC unit of claim 1, wherein the base plate comprises:

a backing plate; and a wall disposed between the backing plate and the bracket, wherein the bracket comprises a bracket opening, the wall comprises a wall opening, the backing plate comprises a backing plate opening, and the bracket, the wall, and the backing plate are configured to be aligned with each other such that the bracket opening, the wall opening, and the backing plate opening are aligned with each other.

9. The HVAC unit of claim 8, wherein the base plate comprises a channel defined by the wall, a second wall extending from and transverse to the wall, and a third wall extending from and transverse to the second wall, wherein the backing plate is disposed in the channel.

10. The HVAC unit of claim 1, wherein the base plate comprises an additional receptacle configured to receive an additional lifting lug, and wherein the HVAC unit comprises:

an additional bracket discrete from the base plate and comprising an additional mounting plate configured to be coupled to the base plate proximate the additional receptacle via one or more additional fasteners; and an additional ledge of the additional bracket extending away from the additional mounting plate and offset from the additional receptacle such that an additional distal portion of the additional ledge is configured to block the additional lifting lug from contacting the outer surface of the HVAC unit componentry when the additional lifting lug is in an additional engaged configuration with the additional receptacle.

11. The HVAC unit of claim 1, wherein the bracket comprises:

a second ledge extending away from the mounting plate;

a first edge extending between the ledge and the second ledge;

a third ledge extending away from the mounting plate, wherein the ledge is disposed between the second ledge and the third ledge; and a second edge extending between the ledge and the third ledge such that a space is defined adjacent to the distal portion of the ledge and between the first edge and the second edge.

12. A heating, ventilation, and/or air conditioning (HVAC) unit, comprising:

a housing configured to house components of the HVAC unit;

a base plate configured to support a weight of the housing and the components of the HVAC unit, the base plate including a plurality of receptacles configured to receive a plurality of lifting lug; and a plurality of brackets corresponding to the plurality of receptacles, each bracket comprising:

a mounting plate coupled to the base plate proximate a corresponding receptacle of the plurality of receptacles;

a first ledge extending away from the mounting plate and offset from the corresponding receptacle of the plurality of receptacles such that a distal portion of the first ledge is configured to block a corresponding lifting lug of the plurality of lifting lugs from contacting a first outer surface of the housing, a second outer surface of the base plate, or both the first surface and the second surface when the corresponding lifting lug is engaged with the corresponding receptacle;

a second ledge extending away from the mounting plate;

a first edge extending between the first ledge and the second ledge;

a third ledge extending away from the mounting plate, wherein the first ledge is disposed between the second ledge and the third ledge; and a second edge extending between the first ledge and the third ledge such that a space is defined adjacent to the distal portion of the first ledge and between the first edge and the second edge.

13. The HVAC unit of claim 12, wherein the second ledge of each bracket comprises an opening, the third ledge of each bracket comprises an additional opening, and the opening and the additional opening are configured to receive respective arms of a clevis.

14. The HVAC unit of claim 12, wherein the second ledge of each bracket comprises a chamfered edge adjacent to the first ledge and extending from the first edge, and the third ledge of each bracket comprises an additional chamfered edge adjacent to the first ledge and extending from the second edge.

15. The HVAC unit of claim 12, comprising an air handling unit (AHU), wherein the AHU comprises the housing and the components of the HVAC unit.

16. The HVAC unit of claim 12, wherein the base plate comprises a first outer rail and a second outer rail opposing the first outer rail, a first portion of the plurality of receptacles is disposed in the first outer rail, and a second portion of the plurality of receptacles is disposed in the second outer rail.

17. An air handling unit (AHU), comprising:

a base plate including a receptacle configured to receive a lifting lug;

a first ledge extending away from the base plate such that a distal portion of the first ledge is configured to block the lifting lug from contacting an outer surface of the HVAC unit when the lifting lug is in an engaged configuration with the receptacle;

a second ledge; and a third ledge, wherein the first ledge is disposed between the second ledge and the third ledge, the second ledge comprises a chamfered edge adjacent to the first ledge, and the third ledge comprises an additional chamfered edge adjacent to the first ledge.

18. The AHU of claim 17, comprising a second ledge and a third ledge, wherein the second ledge comprises an opening, the third ledge comprises an additional opening, and the opening and the additional opening are configured to receive respective arms of a clevis.

19. The AHU of claim 17, wherein the second ledge comprises an edge extending between and transverse to the first ledge and the chamfered edge of the second ledge, and the third ledge comprises an additional edge extending between and transverse to the first ledge and the additional chamfered edge of the third ledge.

* * * * *